United States Patent Office 3,471,539
Patented Oct. 7, 1969

3,471,539
METHOD FOR PREPARING TRIORGANOTIN HALIDES AND BIS(TRIORGANOTIN) OXIDES
Reiichi Suzuki, Nishinomiya-shi, Tadashi Takubo, Amagasaki-shi, Yutaka Shioyama, Suita-shi, Kazuhiko Sakamoto, Amagasaki-shi, and Tadasu Tahara, Osaka-shi, Japan, assignors to Nitto Kasei Co., Ltd., Osaka, Japan, a corporation of Japan
No Drawing. Filed Aug. 23, 1967, Ser. No. 662,588
Int. Cl. C07f 7/22
U.S. Cl. 260—429.7   3 Claims

ABSTRACT OF THE DISCLOSURE

This invention relates to a method of manufacturing substituted triorganotin halides having the general formula of $$R_pR'_qSnX$$

where R is alkyl, cycloalkyl or aryl radical, R' is alkyl or cycloalkyl radical, X is halogen atom, each of $p$ and $q$ is an integer 1–2, and the total of $p$ and $q$ is 3, by the distinctive reaction, in the presence of Cu-Zn alloy, of organotin halides of the general formula $$R_pSnX_{4-p}$$

where R is alkyl, cycloalkyl, or aryl radical, X is halogen atom, and $p$ is an integer 1–2, with compounds of the general formula $$R'X$$

where R' is alkyl or cycloalkyl radical, and X is halogen atom.

---

This invention relates to a method for the manufacture of symmetrically or asymmetrically substituted triorganotin halides.

The demand for trialkyltin and triaryltin compounds has been increasing due to their use as the active ingredient in bactericides, insecticides, fungicides, agrcultiural chemicals, antifouling paints, etc. Organotin compounds of the $R_3SnX$ type have been manufactured in accordance with prior art practices, by the disproportionation reaction of $R_4Sn$ (produced from RMgX and $SnX_4$) with $SnX_4$. In the Grignard reaction large quantity of ether solvent has been used and this has generated a considerable fire hazard. On the other hand, the manufacture of $R_3SnI$ by the reaction of $R_2SnI_2$ with RI in the presence of zinc takes as much time as 10 to 20 hours; in addition the product is a mixture of $R_4Sn$, $R_3SnI$, and $R_2SnI_2$—and the yield of $R_3SnI$ is low. Such methods appear not to be useful for industrial scale production.

It is an object of this invention to provide a method for the manufacture of symmetrically or asymmetrically substituted triorganotin halides.

In accordance with certain of its aspects, this invention relates to the method of producing triorganotin halides having the general formula $$R_pR'_qSnX$$

where R is alkyl, cycloalkyl, or aryl radical, R' is alkyl or cycloalkyl radical, X is halogen atom, each of $p$ and $q$ is an integer 1–2 and the total of $p$ and $q$ is 3, by the reaction or organotin haides having the general formula $$R_pSnX_{4-p}$$

where R is alkyl, cycloalkyl, or aryl radical, X is halogen atom, $p$ is an integer 1–2, with compounds having the general formula $$R'X$$

where R' is alkyl or cycloalkyl radical and X is halogen atom, in the presence of copper-zinc alloy.

The process of this invention is completed in remarkably reduced time—usually two hours, and the product is obtained in a high yield. In addition, the distinction of the reaction is that asymmetrically substituted triorganotin compounds are most easily obtained although, in accordance with prior art, it seemed difficult to obtain these compounds on an industrial scale.

The reaction of this invention in combination with the direct reaction of alkyl halides with tin for manufacturing dialkyltin halide facilitates the preparation of $R_2R'SnX$ in a high yield by such a simplified process as represented by the following equation:

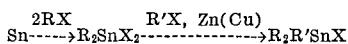

In the compound $R_pSnX_{4-p}$, R may be an alkyl radical such as methyl, ethyl, propyl, butyl, amyl, octyl radical, or cycloalkyl radical such as cyclohexyl, or aryl radical such as phenyl, tolyl, p-chlorophenyl radical. In the compound R'X, R' may be an alkyl radical such as methyl, ethyl, propyl, butyl, amyl, octyl radical, or cycloalkyl radical such as cyclohexyl radical. Alkyl or cycloalkyl radical of R and R' may be either identical with or different from each other. X is a halogen atom such as chlorine, bromine, or iodine atom.

As copper-zinc alloy an alloy containing 0.5%–8% copper is preferable and is used in a preferable form of powder or crumpled foil. In performing this invention, above mentioned raw materials may be heated and reacted in the presence of the copper-zinc alloy. The use of solvent is usually not necessary, although solvent may be used if desired.

The product compound $R_pR'_qSnX$ is obtained in high purity, and directed to various applications by itself. If desired it can be hydrolyzed to the corresponding oxide.

EXAMPLE 1

In a 2 liter flask equipped with a stirrer, reflux condenser and thermometer, 392 g. of dibutyltin diiodide, 234 g. of ethyl iodide and 79 g. of powdered Cu-Zn alloy consisting of 5% copper and 95% zinc each were placed and the mixture heated to 80°–90° C. for 2 hours, at the temperature at which ethyl iodide was mildly refluxed. After the reaction, 800 ml. of dilute hydrochloric acid was added to dissolve zinc iodide and unreacted Cu-Zn alloy. After the organic layer was separated and dried, excess ethyl iodide was distilled off and 322 g. of dibutyl ethyltin iodide was obtained in 82.8% yield. In gas chromatographic analysis, this product proved to contain 2% of dibutyl diethyltin and 2.5% of dibutyltin diiodide, and to be more than 95% pure dibutyl ethyltin iodide.

EXAMPLE 2

In a 2 liter flask equipped with a stirrer, reflux condenser and thermometer, the mixture of 56 g. of butyltin triiodide and 389 g. of dibutyltin diiodide and 340 g. of butyl iodide were placed together with 79 g. of crumpled foil of the same alloy as used in Example 1, and heated to 120°–130° C. for 3 hours. The same procedure as in Example 1 was followed, and the resultant tributyltin iodide was treated with caustic soda solution to obtain 238 g. of bis-tributyltin oxide in 88% yield, and 10 g. of dibutyltin oxide as a by-product. The purity of bis-tributyltin oxide was 97%.

EXAMPLE 3

276 g. of dipropyltin dichloride, 297 g. of amyl iodide and 79 g. of Cu-Zn alloy powder were reacted at 100°–120° C. for 3 hours. After the reaction, excess amyl iodide was distilled off, and then treated with caustic soda solution to obtain 247 g. of bis(dipropyl amyltin) oxide in 87% yield.

EXAMPLE 4

527 g. of diphenyltin diiodide, 93.6 g. of ethyl iodide, 87.2 g. of ethyl bromide and 80 g. of Cu-Zn alloy powder were reacted at 80°–100° C. for 4 hours. After the reaction, unreacted ethyl iodide and ethyl bromide were distilled off. The resultant zinc iodide was dissolved in dilute hydrochloric acid, and the obtained diphenyl ethyltin iodide was treated with caustic soda solution to obtain 249 g. of bis(diphenyl ethyltin)oxide in 78% yield.

What is claimed is:

1. A method of preparing triorganotin halides having the general formula $$R_pR'_qSnX$$

wherein R is alkyl, cycloalkyl or aryl radical, R' is alkyl or cycloalkyl radical, X is halogen atom, each of $p$ and $q$ is an integer 1–2, and the total of $p$ and $q$ is 3, which comprises reacting in the presence of Cu-Zn alloy an organotin halide of the general formula $$R_pSnX_{4-p}$$

wherein R is alkyl, cycloalkyl or aryl radical, X is a halogen atom, $p$ is an integer 1–2, with a compound of the general formula $$R'X$$

wherein R' is alkyl or cycloalkyl radical, and X is a halogen atom.

2. A method as claimed in claim 1 wherein R is selected from the group consisting of butyl, propyl, and phenyl, R' is selected from the group consisting of ethyl, butyl, and amyl, and X is selected from the group consisting of iodine, chlorine, and bromine.

3. A method of preparing bis-tributyltin oxide which comprises reacting butyltin triiodide, dibutyltin diiodide, and butyl iodide in the presence of a Cu-Zn alloy to produce tributyltin iodide and then hydrolyzing said tributyltin iodide with a base to produce bis-tributyltin oxide.

References Cited

UNITED STATES PATENTS

| | | | |
|---|---|---|---|
| 3,082,230 | 3/1963 | Dorfelt et al. | 260—429.7 |
| 3,080,408 | 3/1963 | Andreas et al. | 260—429.7 |
| 3,085,102 | 4/1963 | Yatagai et al. | 260—429.7 |
| 3,100,215 | 8/1963 | Gelbert | 260—429.7 |
| 3,198,819 | 8/1965 | Gloskey | 260—429.7 |
| 3,251,871 | 5/1966 | Dorfelt | 260—429.7 |
| 3,287,386 | 11/1966 | Neuman | 260—429.7 |
| 3,387,011 | 6/1968 | Coates et al. | 260—429.7 |
| 3,387,012 | 6/1968 | Jasching et al. | 260—429.7 |
| 3,340,283 | 9/1967 | Gloskey | 260—429.7 |
| 3,414,595 | 12/1968 | Oakes | 260—429.7 |

TOBIAS E. LEVOW, Primary Examiner

W. F. W. BELLAMY, Assistant Examiner